Patented Aug. 18, 1925.

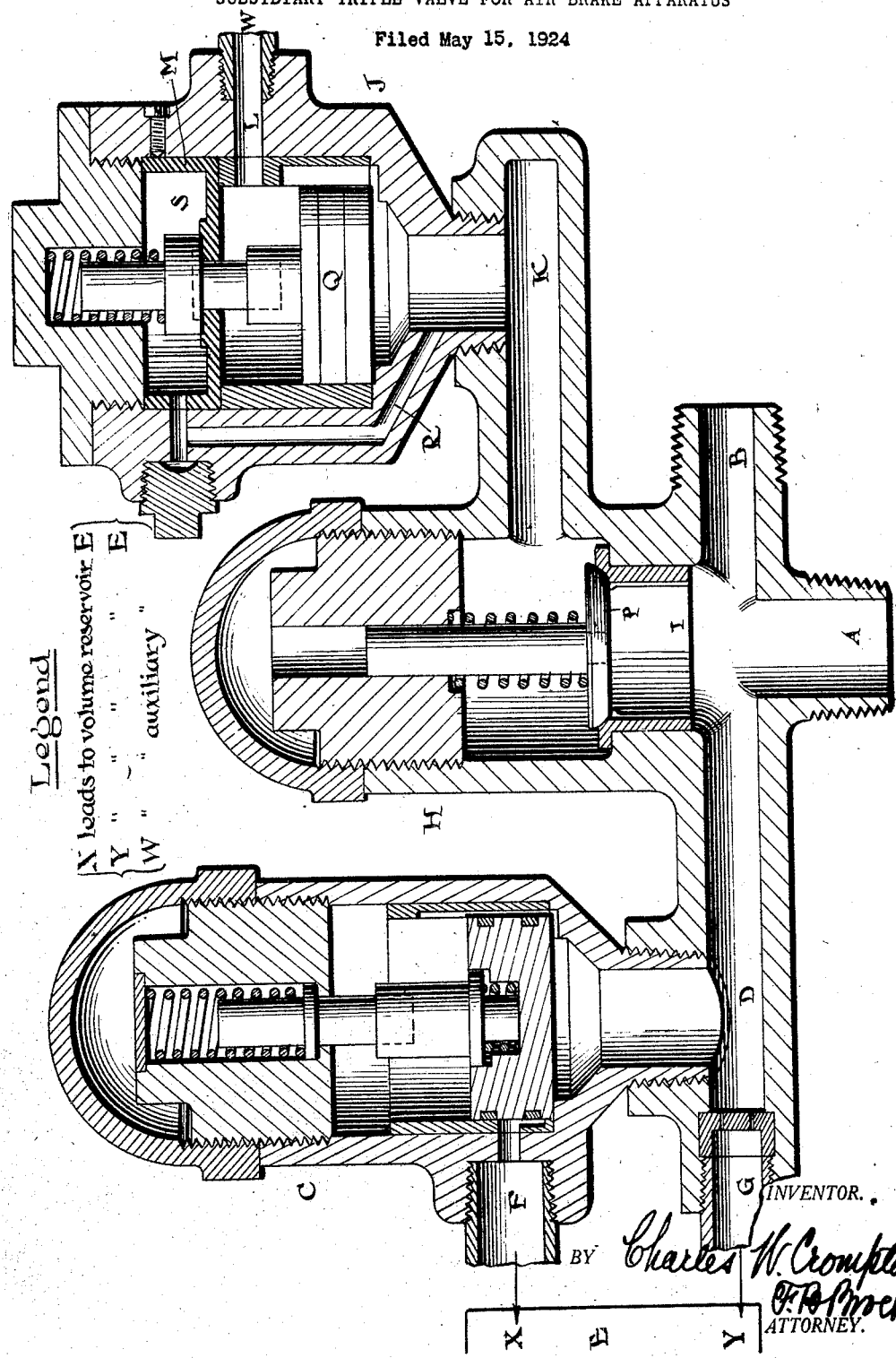

1,549,747

UNITED STATES PATENT OFFICE.

CHARLES W. CROMPTON, OF OGDEN, UTAH.

SUBSIDIARY TRIPLE VALVE FOR AIR-BRAKE APPARATUS.

Application filed May 15, 1924. Serial No. 713,530.

*To all whom it may concern:*

Be it known that I, CHARLES W. CROMPTON, a citizen of the United States, and resident of Ogden, in the county of Weber and State of Utah, have invented certain new and useful Improvements in Subsidiary Triple Valves for Air-Brake Apparatus, of which the following is a specification.

The existing air brake systems (notably the Westinghouse and New York air brake) are admirably adapted for train control within the limits of their capacity. For passenger service they are ideal. The freight equipment of these systems are likewise highly efficient on trains of moderate length. Where an engine is hauling a train of over forty or fifty cars, the existing air brake systems are defective due to the inability of the mechanism to function fully in releasing the air brakes at the rear portion of the train. The present equipment is unable to supply sufficient volume of air to release the brakes of the rear cars, and also recharge the auxiliary reservoirs at the proper time when using the air brake system on grades.

The provisions at present made to overcome this recharge of auxiliary reservoir defect is the employment of a pressure retaining valve on each car. This valve is not automatic but is hand operated. It is used only when the recharge of auxiliary reservoirs exist, which follows after each application of the air brake system.

It is a very dangerous condition for the trainmen and its use requires them to operate the retaining valves on grade by hand. Many lives have been lost in the actuation of these valves.

My invention does away under actual braking conditions with the use of the air retaining valve, although its retention is permissible. A great deal of brake cylinder pressure is lost through leakage in the retaining pipes and its connections.

The cause of the defects above noted is due to the limited capacity of the triple valves for charging the auxiliary reservoirs of the rear cars. The charging action at this point is delayed so long on descending grades that train control is very difficult, due to the inability to recharge auxiliary reservoirs after application of the air brake system.

There are other serious inherent defects in the present system due to the delayed action in recharging the auxiliary reservoirs for the rear cars of a long train.

The triple valve has several important functions to perform. It complies satisfactorily with all the conditions required of it on trains of moderate length. The triple valve is an ingenious device, of marvellous adaptability for the purpose of control of trains of moderate length.

But the limitations imposed upon its design render it unsuitable for the rear cars of long trains.

This is due to the small feed groove in the triple valve, through which the auxiliary reservoir is charged, and which delays its action. This groove can not be enlarged, because of the number of important functions which the triple valve must perform and their conjoint operation.

It therefore becomes necessary at present to provide a pressure retaining valve for each car. The hand operation of this valve retains the brake cylinder pressure and prevents the release of the brakes on down grades while the auxiliary reservoirs at the rear are being slowly recharged.

I do away with the necessity for such a condition with attendant saving of life through the personal handling of these retaining valves.

The inability to release the brakes on the rear of long trains at the proper time and under proper conditions increases very highly the percentage of flat treads and cracked wheels.

Existing air brake apparatus is unable to supply air at the rear of long trains in sufficient volume to the system to release the brakes after service.

My device is used with existing air brake systems. By its use an additional volume of stored air is automatically supplied especially on long trains where it is essential that the air brake system be entirely automatic if life is to be conserved. My invention decreases the number of flat, cracked and burnt wheels, due to sliding, and obviates other expensive and dangerous defects due to the inadequate operation of the triple valve for long trains, and the sticking, leaks, friction, and the like attendant upon its use under such conditions.

The provisions at present made to overcome this release defect are very inefficient, having to be supplied directly from the locomotive.

The use of my device upon the locomotive or upon any one or more, or upon all of the cars does not reduce the effectiveness of the cars not equipped with my device which may be coupled up in the train. My device also prevents an overcharge of the auxiliary reservoirs on the front end of long trains.

The accompanying drawing shows a vertical sectional view of the apparatus of my invention.

Like the triple valve my automatic device has three main valves which function separately and primarily as a volume, an overcharge and a quick charge device. It might properly be called a subsidiary triple valve. Indeed it should be located in the branch train pipe as close to the triple valve as possible. In the description for purposes of clearness, it will be called the "subsidiary" as a short title for identifying it.

The subsidiary is a unit in the branch pipe close to the triple valve. The branch pipe enters at A and leaves at B where it enters the triple valve. The volume valve device C connected with the branch passage at D is also in communication with a storage reservoir E by pipes F and G. The branch pipe also connects with the valved overcharge device H at I.

The quick charge valve device J and the overcharge H are connected by the passage K and a passage L leads from quick charge valve J to the usual auxiliary reservoir.

When the brake pipe pressure is on the system it enters volume device C passing through a feed groove in the piston valve to the pressure limiting chamber and is charged to the pressure in the brake pipe. This pressure increases or diminishes with that in the brake pipe system which is kept within predetermined limits.

When brake pipe pressure increases beyond a given point the piston valve in the volume device C rises against spring pressure before the pressure in the limiting chamber has time to equalize itself with the brake pipe pressure. In this rising it opens a feed groove in the piston and admits brake pipe pressure to the volume reservoir E through the connecting passage F and charges the same until pressure limiting chamber has equalized with brake pipe pressure.

Another passage G connects the subsidiary triple valve and the reservoir E to assist in charging the latter. It has a check valve closing against discharge to brake pipe.

When the pressure limiting chamber of the volume device has equalized with the brake pipe pressure the spring seats the piston valve and cuts out the volume reservoir, which has been charged to brake pipe pressure, and holds it in reserve for releasing purposes whenever a reduction of pressure causes a differential or reduction, say of not less than six pounds for the equalizing pressure in the limiting chamber of the volume device C.

When the valve of the air brake system is moved to full release position the brake pipe pressure increases very rapidly. It forces volume piston valve upwardly compressing its spring and also the second pressure adjusting spring (set at about two pounds.)

The increased pressure upon the volume piston just described opens the volume reservoir pipe F to supply a supplementary pressure of air to the brake pipe for releasing the triple valves on long trains.

The lower volume piston rod is a cut out valve for the feed groove in the piston bushing. The upper piston rod is a guide for the lower one. The upper pressure adjusting spring is regulated by a nut. In practice it should not exceed two pounds pressure independent of the brake pipe pressure. The extension nut locks the adjusting nut. The safety cap excludes extraneous matter, and makes the device air tight.

Having described the volume section of the subsidiary triple valve, the overcharge section will now be taken up.

Passages A B D and I are all in communication with the branch pipe at A. It is this overcharge action which cuts brake pipe pressure from entering the auxiliary reservoir through the subsidiary valve. Its check valve P closes when pressure in the auxiliary reservoir, plus the pressure of the spring on the check valve exceeds the standard brake pipe pressure. This pressure is greater on the front end of trains and causes an overcharge in the auxiliary reservoir.

When overcharge check valve rises the brake pipe air enters through quick charge section of my subsidiary triple valve resulting in an action to be described further on after the details of overcharge section are indicated.

Valve P has a brass bushing and valve seat and a valve stem guided by an adjusting nut screwed into the overcharge valve chamber. A spring surrounds the valve stem and is adjusted by the nut at say twenty pounds pressure. A safety cap covers the overcharge valve section.

The quick charge section of my subsidiary triple valve operates when overcharge valve P opens. Brake pipe pressure enters passage K to the quick charge piston Q and passes through a feed groove in the piston wall say at the rate of sixteen to twenty five seconds, to the chamber above the piston. Thence it passes through the pipe L to the auxiliary reservoir say at seventy pounds brake pipe pressure.

It will be noted that this quick charge section of my subsidiary assists very materially in charging the auxiliary reservoirs.

In the present equipment this action is very slow owing to the necessarily limited size of the feed groove in the triple valve—a feed groove which is likely to become corroded with extraneous matter and thus further decrease its efficiency. Such defective apparatus also requires the use of hand operated pressure retaining valves on each car as described elsewhere and not necessary with my invention.

It should also be noted that there is a retarding effect on this quick charge section of my subsidiary triple valve functioning on the front end of long trains and giving a uniform and very quick charge of the auxiliary reservoirs after every application of the train brakes.

The pressure in branch passage K upon opening valve P, also admits air by a by-pass R, to the chamber S above the piston Q, acting to retard its upward motion. This tends to retard the charging of the auxiliary reservoirs on the front end of long trains. It gives a uniform pressure to the auxiliary reservoir by supplying more air to the rear of trains and less to the front.

The retarding device has a brass bushing M seating air tight on a retarding valve having a seat thereon. The bushing M has a feed groove in its side connecting with the by-pass R and forms the retarding air port. It charges the auxiliary reservoir say at the rate of forty to fifty pounds plus triple valve feed groove charge.

The restriction in the port of the bushing varies in areas due to differentials in pressure of the quick charge and retarding valves.

The device operates when retarding valve spring in chamber S is compressed and is regulated to act automatically when the car is located in the train say forty or more cars from the front. Retardation occurs when quick charge piston Q rises and cuts out the full charge port in the piston wall and opens the retarding valve, allowing air in chamber S to feed through groove in the bushing connecting with by-pass R at brake pipe pressure to the auxiliary reservoir through the pipe L.

To the rear of said forty cars the pressure is not sufficient to raise the retarding spring. Thereafter air is fed at full feed pressure to charge the auxiliary reservoirs.

While charging long trains, the adjustment of the quick charge top cap of the quick charge section serves to regulate the retarding valve.

The application of the brakes by reducing the pressure during service or emergency has no effect on the subsidiary triple valve. There is at such times no communication between the brake pipe and the volume or auxiliary reservoirs. The triple valves function independently of the subsidiary triple valve.

The volume reservoir E maintains a large volume of air which is automatically fed to the brake pipe when the engineer releases the brakes through the cab valve on the locomotive. The pressure is therefore rapidly increased and it forces the triple valve piston to release position. The volume reservoir and its quick release valve C act to assist the engineer after a brake application to release the brakes and restore the brake pipe volume of air.

When the proper brake pipe pressure is reached valve P opens and the auxiliary reservoir is charged as elsewhere described. If the subsidiary triple valve is located on a car at the front of a long train where the volume of air is greater the auxiliary-reservoir valve device J is actuated and said reservoir is charged as set forth elsewhere. This action permits the brake pipe volume of air a chance to flow more rapidly toward the rear of the train and causes a very quick and uniform charge of all the auxiliaries on a long train. Say thirty cars to the rear the quick charge device J does not come into action because of the better equalization of the air flow through the brake pipe. It will thus be perceived that this device is automatic regardless of the point where a particular subsidiary triple valve is located in the train.

My subsidiary triple valve functions automatically with all the standard brake systems without any alteration or modification thereof.

Claims:

1. Automatic air brake apparatus having means accessory of its triple valve consisting of a subsidiary triple valve provided with means independent of the auxiliary reservoir for storing air at air brake pressure, means for automatically charging the auxiliary reservoir from such stored air upon excessive brake pipe pressure, and means for regulating the charging means operative to equalize the pressure in the auxiliary reservoir.

2. Automatic air brake apparatus having means accessory to its triple valve consisting of a subsidiary triple valve provided with means for maintaining an increased volume of stored air in a container separate from the auxiliary reservoir, means for increasing the brake pipe volume pressure and for recharging the auxiliary reservoir from the container after application of the brakes.

CHARLES W. CROMPTON.